US010868957B2

(12) United States Patent
Kang et al.

(10) Patent No.: US 10,868,957 B2
(45) Date of Patent: Dec. 15, 2020

(54) APPARATUS AND METHOD FOR PROCESSING IMAGE TO RECONSTRUCT IMAGE

(71) Applicant: SAMSUNG ELECTRONICS CO., LTD., Suwon-si (KR)

(72) Inventors: Deokyoung Kang, Suwon-si (KR); Yang Ho Cho, Seongnam-si (KR); Dong Kyung Nam, Yongin-si (KR); Daekun Yoon, Suwon-si (KR); Kyuhwan Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/376,512

(22) Filed: Apr. 5, 2019

(65) Prior Publication Data

US 2020/0128176 A1    Apr. 23, 2020

(30) Foreign Application Priority Data

Oct. 18, 2018    (KR) .................. 10-2018-0124592

(51) Int. Cl.
*H04N 5/232* (2006.01)
*G02B 27/09* (2006.01)
*H04N 5/225* (2006.01)
*G06F 9/30* (2018.01)

(52) U.S. Cl.
CPC ..... *H04N 5/23229* (2013.01); *G02B 27/0961* (2013.01); *G06F 9/3004* (2013.01); *H04N 5/2254* (2013.01)

(58) Field of Classification Search
CPC ............. H04N 5/23229; H04N 5/2254; G06F 9/3004; G02B 27/0961
USPC ....................................... 348/222.1
See application file for complete search history.

(56) References Cited

U.S. PATENT DOCUMENTS

| | | | |
|---|---|---|---|
| 9,645,680 B1 | 5/2017 | El Dokor et al. | |
| 2008/0030596 A1* | 2/2008 | Sung ............... | G06T 3/4015 348/224.1 |
| 2012/0188409 A1 | 7/2012 | Gallagher et al. | |
| 2016/0277771 A1 | 9/2016 | Nakagami et al. | |
| 2018/0152692 A1* | 5/2018 | Cho ................. | H04N 13/106 |
| 2019/0164255 A1 | 5/2019 | Cho et al. | |

FOREIGN PATENT DOCUMENTS

| | | |
|---|---|---|
| JP | 2009124213 A | 6/2009 |
| JP | 2010028814 A | 2/2010 |
| JP | 2011044801 A | 3/2011 |
| JP | 2013031154 A | 2/2013 |
| JP | 2014155071 A | 8/2014 |
| JP | 5591851 B2 | 9/2014 |

(Continued)

*Primary Examiner* — Lin Ye
*Assistant Examiner* — Chan T Nguyen
(74) *Attorney, Agent, or Firm* — Sughrue Mion, PLLC

(57) ABSTRACT

Provided is an image processing apparatus and method. The image processing method includes obtaining, by a sensor and a lens array, a first image corresponding to an original image, identifying the first image obtained by the sensor and the lens array, rearranging the first image in response to rearranging a transformation matrix based on the sensor and the lens array, and generating a second image by performing a color interpolation on the rearranged first image.

18 Claims, 13 Drawing Sheets

(56) References Cited

FOREIGN PATENT DOCUMENTS

| | | |
|---|---|---|
| JP | 2016054405 A | 4/2016 |
| JP | 2017016593 A | 1/2017 |
| KR | 10-0781552 B1 | 12/2007 |
| KR | 10-0827242 B1 | 5/2008 |
| KR | 10-2018-0059233 A | 6/2018 |

* cited by examiner

| Color arrangement | Number of lenses | Number of sensing elements | First image | Rearrangement |
|---|---|---|---|---|
| 210 / 211 / 212 | Odd | Odd | 251 | 261 |
| | Odd | Even | 252 | 262 |
| | Even | Odd | 253 | 263 |
| | Even | Even | 254 | 264 Not relatively prime |
| 220 / 221 / 222 | Odd | Odd | 255 | 265 |
| | Odd | Even | 256 | 266 |
| | Even | Odd | 257 | 267 |
| | Even | Even | 258 | 268 Not relatively prime |

FIG. 2

First image 610

Rearrangement

Rearranged first image 620

First image 810

Rearrangement

Rearranged first image 820

Area1  Area2
 821    822

APPARATUS AND METHOD FOR PROCESSING IMAGE TO RECONSTRUCT IMAGE

CROSS-REFERENCE TO RELATED APPLICATION

This application claims priority from Korean Patent Application No. 10-2018-0124592, filed on Oct. 18, 2018 in the Korean Intellectual Property Office, the disclosure of which is incorporated herein by reference in its entirety.

BACKGROUND

Field

Example embodiments of the present disclosure relate to methods and apparatuses consistent with image processing technology.

Description of the Related Art

With developments in optical and image processing techniques, imaging apparatuses are being applied in wide range of fields, such as multimedia contents, security, and recognition. For example, an imaging apparatus may be mounted to a mobile device, a camera, a vehicle, a computer, and the like, and may acquire data for capturing an image, recognizing an object, or controlling a device. The volume (overall size) of the imaging apparatus may be determined based on a size of a lens, a focal length of the lens, and a size of a sensor. For example, the volume of the imaging apparatus may be determined based on the size of the lens and the size of the sensor. According to a reduction in the size of the sensor, the quantity of light incident to the sensor may decrease. Accordingly, a resolution of an image may decrease or photographing in a low-resolution environment may be difficult. To decrease the volume of the imaging apparatus, a multi-lens including small lenses may be used. According to a decrease in the size of the lens, the focal length of the lens may decrease. Accordingly, the volume of the imaging apparatus may decrease through the multi-lens.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an image processing method including obtaining, by a sensor and a lens array, a first image corresponding to an original image, identifying the first image obtained by the sensor and the lens array, rearranging the first image in response to rearranging a transformation matrix based on the sensor and the lens array, and generating a second image by performing a color interpolation on the rearranged first image.

The sensor may include a plurality of sensing elements, wherein the lens array includes a plurality of lenses, and wherein a number of the plurality of sensing elements and a number of the plurality of lenses are relatively prime.

The number of the plurality of sensing elements may be a natural multiple of the number of the plurality of lenses plus 1.

The transformation matrix may be determined based on the number of the plurality of sensing elements and the number of the plurality of lenses.

The transformation matrix may be rearranged based on a transformation matrix that is rearranged based on the original image being at an infinite distance.

The rearranging the first image may include collecting a plurality of constituent elements of a same location in the first image, and performing a phase-inversion on the collected plurality of constituent elements of the location and mapping the phase-inverted plurality of constituent elements.

The rearranged first image may include an inconsecutive section based on a predetermined unit, and color uniformity of red-green-blue (RGB) may be uniform in an area surrounded by inconsecutive section.

The generating the second image may include generating the second image by performing the color interpolation on the area surrounded by the inconsecutive section.

The image processing method may further include outputting an image corresponding to the original image by reconstructing the color-interpolated second image.

The image processing method, wherein, based on applying a color filter to the lens array, the first image may be generated based on a number of the plurality of lenses being even and a number of the plurality of sensing elements being odd, the number of the plurality of lenses being odd and the number of the plurality of sensing elements being even, or the number of the plurality of lenses being odd and the number of the plurality of sensing elements being odd.

The image processing method, wherein, based on applying a color filter to the sensor, the first image may be generated based on a number of the plurality of lenses being even and a number of the plurality of sensing elements being odd or the number of the plurality of lenses being odd and the number of the plurality of sensing elements being even.

A non-transitory computer-readable medium storing instructions that, when executed by a processor, cause the processor to perform the image processing method.

According to another aspect of an example embodiment, there is provided an image processing apparatus including a processor, and a memory configured to store computer-readable instructions, wherein the processor is configured execute the instructions to obtain, by a sensor and a lens array, a first image corresponding to an original image, identify the first image obtained by the sensor and the lens array, rearrange the first image in response to rearranging a transformation matrix based on the sensor and the lens array, and generate a second image by performing a color interpolation on the rearranged first image.

The sensor may include a plurality of sensing elements, wherein the lens array may include a plurality of lenses, wherein a number of the plurality of sensing elements and a number of the plurality of lenses may be relatively prime, and wherein the number of the plurality of sensing elements may be a natural multiple of the number of the plurality of lenses plus 1.

The transformation matrix may be rearranged based on a transformation matrix that is rearranged based on the original image being at an infinite distance.

The processor may be further configured to collect a plurality of constituent elements of a same location in the first image, and to perform a phase-inversion on the collected plurality of constituent elements of the same location, and map the phase-inverted plurality of constituent elements in response to rearranging the first image.

The rearranged first image may include an inconsecutive section based on a predetermined unit, and a color uniformity of red-green-blue (RGB) may be uniform in an area surrounded by the inconsecutive section.

The processor may be further configured to generate the second image by performing the color interpolation on the area surrounded by the inconsecutive section, based on generating the second image by performing the color interpolation on the rearranged first image.

The image processing apparatus, wherein, based on applying a color filter to the lens array, the first image may be generated based on a number of the plurality of lenses being even and a number of the plurality of sensing elements being odd, the number of the plurality of lenses being odd and the number of the plurality of sensing elements being even, or the number of the plurality of lenses being odd and the number of the plurality of sensing elements being odd.

The image processing apparatus, wherein, based on applying a color filter to the sensor, the first image may be generated based on a number of the plurality of lenses being even and a number of the plurality of sensing elements being odd or if the number of the plurality of lenses being odd and the number of the plurality of sensing elements being even.

BRIEF DESCRIPTION OF THE DRAWINGS

The above and/or other aspects will be more apparent by describing certain example embodiments with reference to the accompanying drawings, in which:

FIG. 2 illustrates an example of color uniformity based on a sensor and a lens array according to an example embodiment;

DETAILED DESCRIPTION

Figure 1:
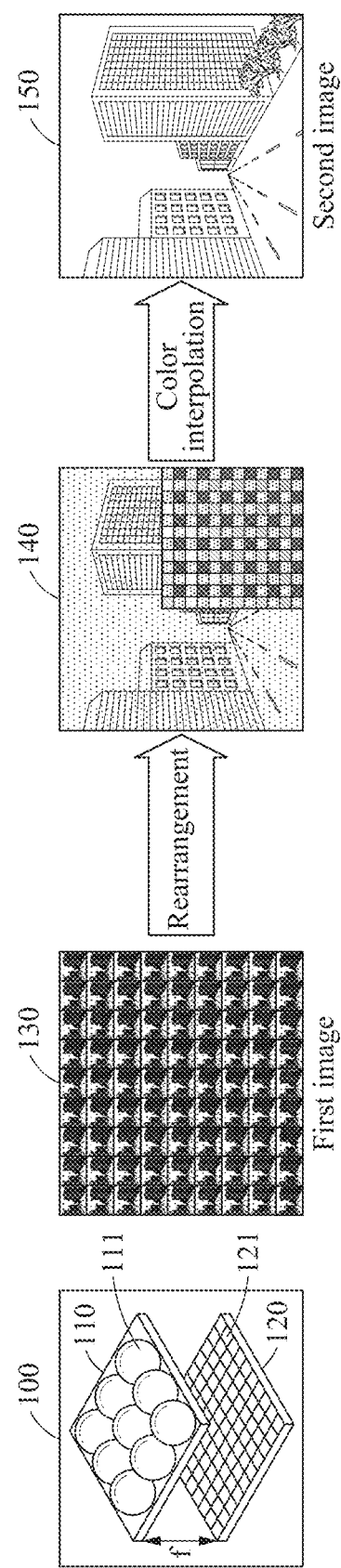
FIG. 1 illustrates an example of an image processing process according to an example embodiment.

Reference will now be made in detail to example embodiments, examples of which are illustrated in the accompanying drawings, wherein like reference numerals refer to the like elements throughout. Example embodiments are described below in order to explain the present disclosure by referring to the figures.

The following structural or functional descriptions are merely examples, and the scope of the example embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Also, when describing with reference to the accompanying drawings, like numerals refer to like elements throughout although they are illustrated in the different drawings and a repeated description related to is omitted here.

FIG. 1 illustrates an example of an image processing process according to an example embodiment.

Quality of an image captured and processed by an image processing apparatus 100 may be determined based on a number of sensing elements 121 included in a sensor 120 and the quantity of light incident to the sensing elements 121. For example, a resolution of an image may be determined based on the number of sensing elements 121 included in the sensor 120 and sensitivity of the image may be determined based on the quantity of light incident to the sensing elements 121. The quantity of light incident to the sensing element 121 may be determine based on a size of the sensing element 121. According to an increase in the size of the sensing element 121, the quantity of light incident to the sensing element 121 may increase and the dynamic range of the sensor 120 may increase. Accordingly, as the number of sensing elements 121 included in the sensor 120 increases, the sensor 120 may capture a high-resolution image. As the size of the sensing element 121 increases, the sensor 120 may operate to be advantageous for high sensitivity imaging in a low light environment.

The volume of the image processing apparatus 100 may be determined based on a focal length f of a lens 111. For example, the volume of the image processing apparatus 100 may be determined based on an interval between the lens 111 and the sensor 120. Here, since the sensor 120 needs to be present at the focal length f of the lens 111 to collect light refracted by the lens 111, the lens 111 and the sensor 120 included in the image processing apparatus 100 may need to be separate by the focal length f of the lens 111. The focal length f of the lens 111 is determined based on a field of view of the image processing apparatus 100 and a size of the lens 111, for example, a radius of an aperture of the lens 111. For example, when the field of view is fixed, the focal length increases to be proportional to the size of the lens 111. Also, the size of the lens 111 may be determined based on the size of the sensor 120. For example, the size of the lens 111 needs to increase according to an increase in the size of the sensor 120 to capture an image within desired field of view range.

As described above, the volume of the image processing apparatus 100 may increase to increase the sensitivity of the image while maintaining the field of view and the resolution of the image. For example, to increase the sensitivity of the image while maintaining the resolution of the image, the size of each sensing element 121 may need to increase while maintaining the number of sensing elements 121 included in the sensor 120. Thus, the size of the sensor 120 may increase. Here, to maintain the field of view, the size of the lens 111 increases according to the increase in the size of the sensor 120, and thus the focal length f of the lens 111 increases. Thus, the volume of the image processing apparatus 100 increases.

To decrease the volume of the image processing apparatus 100, design methods of reducing the size of the sensing element 121 while maintaining a resolution of the sensor 120 or decreasing the resolution of the sensor 120 while maintaining the size of the sensing element 121 may be considered. Here, in response to reducing the size of the sensing element 121 while maintaining the resolution of the sensor 120, the size of the sensor 120 and the focal length f of the lens 111 may decrease, which may lead to decreasing the volume of the image processing apparatus 100 and degrading the sensitivity of the image. In this case, the low light image quality may be degraded. Also, in response to decreasing the resolution of the sensor 120 while maintaining the size of the sensing element 121, the size of the sensor 120 and the focal length f of the lens 111 may decrease, which may lead to decreasing the volume of the image processing apparatus 100 and degrading the resolution of the image.

The following example embodiments provide technology for more accurately processing a color image while satisfying a desired field of view, resolution, sensitivity, and volume of the image processing apparatus 100. For example, by designing the size of the lens 111 to be relatively small while maintaining the size of the sensor 120, the focal length of the lens 111 may decrease and a thickness of the image processing apparatus 100 may also decrease. Referring to FIG. 1, the image processing apparatus 100 includes a lens array 110 and the sensor 120. The lens array 110 includes the plurality of lenses 111, and the sensor 120 includes the plurality of sensing elements 121. The lens array 110 and the sensor 120 included in the image processing apparatus 100 will be further described with reference to FIG. 2.

According to an example embodiment, according to a decrease in a size of each of the lenses 111 included in the lens array 110, that is, according to an increase in the number of lenses 111 included in the same area of the lens array 110, the focal length f of the lens 111 and the thickness of the image processing apparatus 100 may decrease. In this case, the image processing apparatus 100 may reconstruct a high-resolution image corresponding to an original image by combining low-resolution images captured using the lens array 110. Accordingly, a thin camera may be implemented by increasing the number of lenses 111 included in the lens array 110.

Each individual lens 111 of the lens array 110 may cover a desired area of the sensor 120 corresponding to a size of the corresponding lens 111. That is, light that passes through each lens 111 may be incident to the sensing elements 121 of the sensor 120 included in the corresponding area. The light may include a plurality of rays. Each of the sensing elements 121 of the sensor 120 may generate sensing information based on a ray incident through the lens 111 of the lens array 110. For example, the sensing element 121 may generate sensing information based on the ray that is incident through the lens 111. The image processing apparatus 100 may determine color information corresponding to viewpoints included in a field of vision of the image processing apparatus 100 based on sensing information output from the sensor 120, and may generate a first image 130 based on the determined color information. Here, the first image 130 represents an image captured using the lens array 110 and the sensor 120, and the color information may be included in the sensing information.

Also, the sensing element 121 may include a color filter configured to sense a color. The sensing element 121 may generate color information corresponding to a specific color. Each of the plurality of sensing elements 121 included in the sensor 120 may be disposed to sense a color different from that of another sensing element 121 spatially adjacent thereto. The sensing element 121 may include, for example, a pixel.

When a full rank relationship is established between source signal information and sensing information corresponding to viewpoints included in the field of vision of the image processing apparatus 100 by sufficiently securing diversity of sensing information, the first image 130 corresponding to a maximum resolution of the sensor 120 may be derived. The diversity of the sensing information may be secured based on parameters of the image processing apparatus 100, such as the number of lenses 111 included in the lens array 110 and the number of sensing elements 121 included in the sensor 120.

The image processing apparatus 100 may generate a rearranged first image 140 through rearrangement, and may generate a second image 150 by performing a color interpolation on the rearranged first image 140. Accordingly, the image processing apparatus 100 may output a high-resolution image corresponding to an original image by reconstructing the second image 150.

FIG. 2 illustrates an example of color uniformity based on a sensor and a lens array according to an example embodiment.

An image processing apparatus 210 according to an example embodiment may include a sensor 212 and a lens array 211 to which a color filter is applied. Here, color uniformity of a rearranged first image may differ depending on whether a number of lenses 230 and a number of sensing elements 240 are odd or even. Here, the number of lenses 230 and the number of sensing elements 240 may be relatively prime, which will be further described with reference to FIG. 3.

Here, the color uniformity refers to a level of uniformity of red-green-blue (RGB) that is an example of a color coordinate system. It is provided as an example only and the color coordinate system is not limited to the RGB. According to an example embodiment, as the color uniformity increases, the performance of color interpolation performed by the image processing apparatus 210 may be enhanced and a high-resolution image may be reconstructed. Here, an example of uniform RGB may include a Bayer pattern.

For example, if the number of lenses 230 is odd and the number of sensing elements 240 is odd, the image processing apparatus 210 may rearrange a first image 251 that is acquired using the lens array 211 and the sensor 212. A rearranged first image 261 may include RGB that is uniformly arranged based on a predetermined unit. Here, although all of the number of lenses 230 and the number of sensing elements 240 are odd, a case in which they are not relatively prime may be excluded.

As another example, if the number of lenses 230 is odd and the number of sensing elements 240 is even, or if the number of lenses 230 is even and the number of sensing elements 240 is odd, the image processing apparatus 210 may rearrange a first image 252 or a first image 253 that is acquired using the lens array 211 and the sensor 212. Here, a rearranged first image 262 or a rearranged first image 263 may include RGB that is uniformly arranged based on a predetermined unit.

Here, if all of the number of lenses 230 and the number of sensing elements 240 are even, a relatively prime relationship is not met. Accordingly, a rearranged first image 264 in which RGB is uniformly arranged is may not be acquired based on rearranging a first image 254.

An image processing apparatus 220 according to an example embodiment may include a lens array 221 and a sensor 222 to which a color filter is applied. Here, color uniformity of a rearranged first image may differ depending on whether the number of lenses 230 and the number of sensing elements 240 are odd or even. The number of lenses 230 and the number of sensing elements 240 may be relatively prime, which will be further described with reference to FIG. 3.

For example, if the number of lenses 230 is odd and the number of sensing elements 240 is even, or if the number of lenses 230 is even and the number of sensing elements 240 is odd, the image processing apparatus 220 may rearrange a first image 256 or a first image 257 that is acquired using the lens array 221 and the sensor 222. A rearranged first image 266 or a rearranged first image 267 may include RGB that is uniformly arranged based on a predetermined unit.

Here, if all of the number of lenses 230 and the number of sensing elements 240 are even, the aforementioned relatively prime relationship is not met. Accordingly, a rearranged first image 268 may not be acquired by rearranging a first image 258. Also, if all of the number of lenses 230 and the number of sensing elements 240 are odd, the image processing apparatus 220 may not perform a color interpolation. For example, if the lens array 221 and the sensor 222 to which a color filter is applied is used, and, for example, if all of the number of lenses 230 and the number of sensing elements 240 are odd, the image processing apparatus 220 may not perform the color interpolation on an image 265 rearranged from a first image 255.

According to an example embodiment, comparing the image processing apparatus 210 to the image processing apparatus 220, the lens array 211 to which the color filter is applied may remove chromatic aberration. Therefore, compared to the lens array 221, a lens thickness used for the lens array 211 may decrease.

Figure 3:
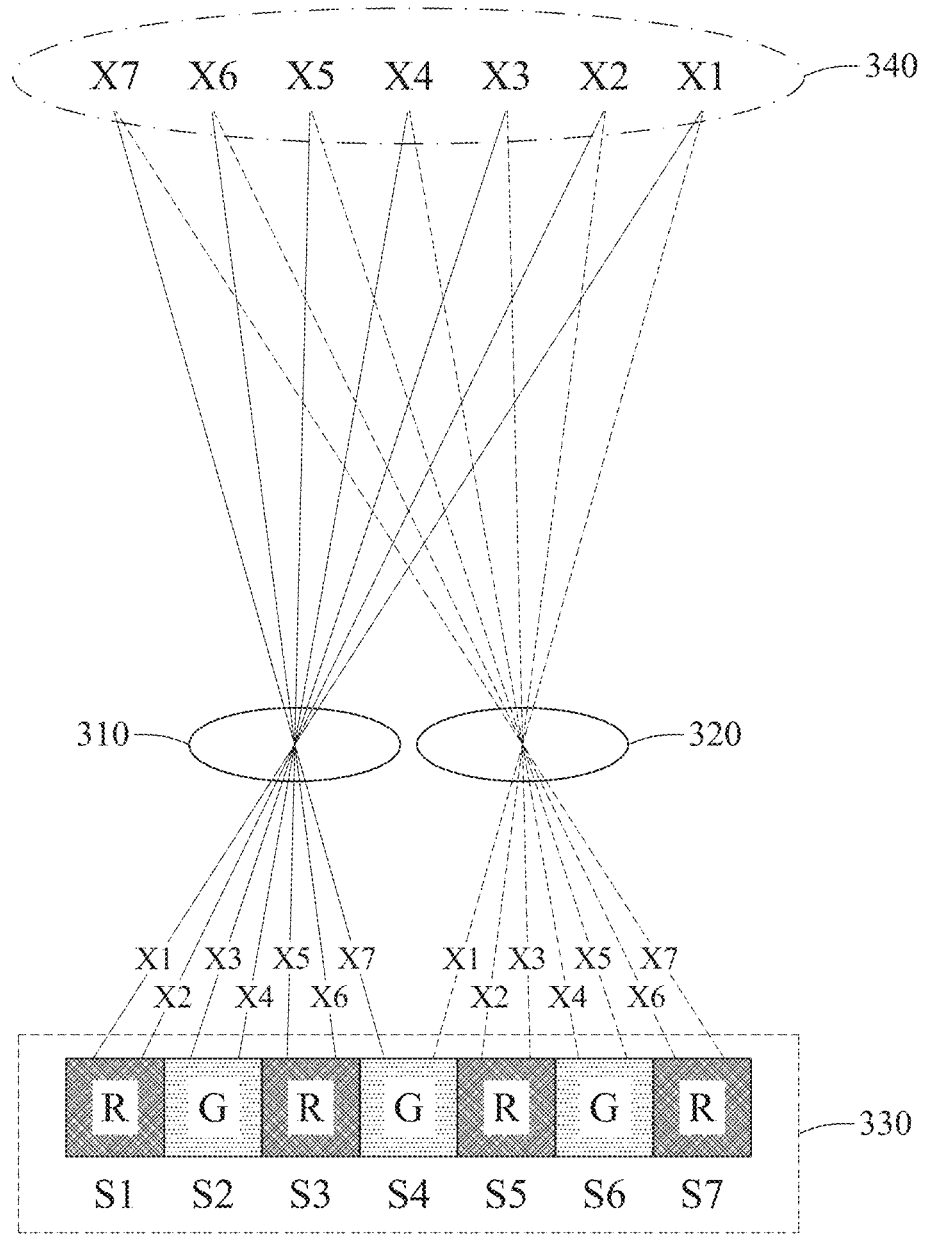
FIG. 3 illustrates an example of a relationship between a number of sensing elements and a number of lenses according to an example embodiment.

FIG. 3 illustrates an example of a relationship between a number of sensing elements and a number of lenses according to an example embodiment.

Referring to FIG. 3, a sensor 330 may receive rays X1, X2, X3, X4, X5, X6, and X7 corresponding to individual viewpoints 340. The rays X1 to X7 may be detected at the sensor 330 through each of lenses 310 and 320. The sensor 330 may include sensing elements S1, S2, S3, S4, S5, S6, and S7 corresponding to a first line among a plurality of lines. Hereinafter, description is made based thereon.

The sensing elements S1 to S7 may overlappingly sense the rays X1 to X7 that pass through the plurality of lenses 310 and 320. For example, a focal length from each of the lenses 310 and 320 included in a lens array to the sensor 330 may decrease. Accordingly, the sensing element S1 may generate sensing information in which the rays X1 and X2 overlap. The image processing apparatus may reconstruct a high-resolution image corresponding to an original image based on such overlapping sensing information.

The sensing information generated by each of the sensing elements S1 to S7 may be modeled based on source signal information corresponding to a ray incident from each of the viewpoints 340, as expressed by Equation 1.

$$S = T \cdot X \qquad \text{[Equation 1]}$$

In Equation 1, S denotes a matrix indicating sensing information sensed by an individual sensing element. X denotes a matrix indicating source signal information corresponding to a ray incident from an individual viewpoint corresponding sensing element among the sensing elements S1 to S7. T denotes a transformation matrix and may represent a relationship between sensing information detected by the sensing elements S1 to S7 and source signal information corresponding to incident light. The rays X1 to X7, the lenses 310 and 320, and the sensing elements S1 to S7 of FIG. 3 may be modeled as represented by Equation 2.

$$\begin{matrix} S & T & X \end{matrix} \qquad \text{[Equation 2]}$$

$$\begin{bmatrix} S1 \\ S2 \\ S3 \\ S4 \\ S5 \\ S6 \\ S7 \end{bmatrix} \begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 1 & 0 & 0 & 0 & 0 & 0 & 1 \\ 0 & 1 & 1 & 0 & 0 & 0 & 0 \\ 0 & 0 & 0 & 1 & 1 & 0 & 0 \\ 0 & 0 & 0 & 0 & 0 & 1 & 1 \end{bmatrix} \begin{bmatrix} X1 \\ X2 \\ X3 \\ X4 \\ X5 \\ X6 \\ X7 \end{bmatrix}$$

According to an example embodiment, a relationship, for example, the transformation matrix, between sensing information corresponding to the sensing elements S1 to S7 included in the sensor 330, and source signal information corresponding to the rays X1 to X7 incident from the individual viewpoints 340 may be determined based on arrangement between the lenses 310 and 320 and the sensor 330, the number of lenses 310 and 320 that constitute the lens array, and the number of sensing elements S1 to S7 that constitute the sensor 330.

For presence of an inverse transformation of the transformation matrix T, the transformation matrix T may meet a full-rank condition. Since the inverse matrix of the transformation matrix T is present, the matrix X indicating the source signal information may be calculated by multiplying the inverse matrix of the transformation matrix T by the matrix S indicating the sensing information detected by the sensing element, according to Equation 3.

$$X = T^{-1} \cdot S \qquad \text{[Equation 3]}$$

So that the transformation matrix T may meet the full-rank condition, the number of lenses 310 and 320 included in the lens array and the number of sensing elements included in the sensor 330 may be relatively prime. In this case, at least a portion of the sensing elements included in the sensor 330 may generate sensing information based on light incident through the different lenses 310 and 320. Here, the transformation matrix T may meet the full rank condition.

For example, referring to FIG. 3, since the number of lenses 310 and 320 is 2 and the number of sensing elements S1 to S7 is 7, they are relatively prime and the sensing element S4 may generate sensing information based on light incident through the lens 310 and light incident through the lens 320. Accordingly, the transformation matrix T of FIG. 3 may meet the full-rank condition.

The relationships between the rays X1 to X7 and the sensing elements S1 to S7 may be modeled as represented by Equation 4.

$$RX = T_R^{-1} \cdot RS$$

$$GX = T_G^{-1} \cdot GS$$

$$BX = T_B^{-1} \cdot BS \qquad \text{[Equation 4]}$$

In Equation 4, RX denotes a color signal matrix indicating a red color value among the rays X1 to X7 incident from the respective corresponding viewpoints 340, GX denotes a color signal matrix indicating a green color value among the rays X1 to X7 incident from the respective corresponding viewpoints 340, and BX denotes a color signal matrix indicating a blue color value among the rays X1 to X7 incident from the respective corresponding viewpoints 340. RS, GS, and BS may represent respectively sensing information matrices indicating red, green, and blue corresponding to locations of the sensing elements S1 to S7 included in the sensor 330. TR, TG, and TB denote transformation matrices configured to transform the color signal matrices corresponding to red, green, and blue to sensing information matrices, respectively.

Each of the sensing elements S1 to S7 may detect a single color only and be modeled as represented by Equation 5. For example, the sensing elements S1, S3, S5, and S7 may detect red from the rays X1 to X7, and the sensing elements S2, S4, and S6 may detect green from the rays X1 to X7. Accordingly, green and/or blue corresponding to the sensing elements S1, S3, S5, and/or S7 may be estimated using another sensing element. Red and/or blue corresponding to the sensing elements S2, S4, and/or S6 may be estimated using another sensing element.

$$\begin{bmatrix} RS1 \\ GS2 \\ RS3 \\ GS4 \\ RS5 \\ GS6 \\ RS7 \end{bmatrix} = \begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 1 & 0 & 0 & 0 & 0 & 0 & 1 \\ 0 & 1 & 1 & 0 & 0 & 0 & 0 \\ 0 & 0 & 0 & 1 & 1 & 0 & 0 \\ 0 & 0 & 0 & 0 & 0 & 1 & 1 \end{bmatrix} \begin{bmatrix} X1 \\ X2 \\ X3 \\ X4 \\ X5 \\ X6 \\ X7 \end{bmatrix} \qquad \text{[Equation 5]}$$

In Equation 5, RS1, RS3, RS5, and RS7 respectively denote color information detected by the sensing elements S1, S3, S5, and S7 that detect red. Also, GS2, GS4, and GS6 respectively denote color information detected by the sensing element S2, S4, and S6 that detect green. Here, modeling a relationship between the rays X1 to X7 and the sensing elements S1 to S7 for red, Equation 5 may be represented by Equation 6.

Here, RX1 corresponds to a red signal included in the ray X1 and RX2 corresponds to a red signal included in the ray X2. Also, RS5 denotes color information in which the ray signals RX2 and RX3 are mixed and RS3 denotes color information in which ray signals RX5 and RX6 are mixed.

$$RS1 = RX1 + RX2$$

$$RS3 = RX5 + RX6$$

$$RS5 = RX2 + RX3$$

$$RS7 = RX6 + RX7 \qquad \text{[Equation 6]}$$

According to an example embodiment, color information detected by other sensing elements may be used to estimate red at locations corresponding to GS2, GS4, and GS6. For example, since the sensing element S2 detects green, color information detected by another sensing element may be used to estimate red at a location corresponding to the sensing element S2. Hereinafter, a process of estimating red at a location corresponding to the sensing element S2 will be described.

To estimate red at the location corresponding to the second element S2, it may be more appropriate to use sensing information generated by another sensing element including relevant information rather than using sensing information generated by a sensing element spatially adjacent to the sensing element S2.

Here, a source red signal corresponding to the sensing element S2 is RX3+RX4. RX3 corresponds to a red signal included in the ray X3 and RX4 corresponds to a red signal included in the ray X4. The ray X3 may be incident to the sensing element S2 and also incident to the sensing element S5 capable of detecting red. The ray X4 may be incident to the sensing element S2 capable of detecting green and to the sensing element S6 capable of detecting green.

For example, if RS1 and RS3 detected from the sensing elements S1 and S3 spatially adjacent to the sensing element S2 are used, RS2 may be arithmetically estimated by (RS1+RS3)/2. Accordingly, when a spatially adjacent sensing element is used, color interpolation may not be accurately performed due to many errors.

The image processing apparatus may estimate RS2 based on color information detected by the sensing element S3 spatially adjacent to the sensing element S2 and color information detected by the sensing element S5 including relevant information. Here, the image processing apparatus may apply a weight $\alpha^-$ to the detected color information and may estimate RS2 as represented by Equation 7.

$$RS2 \approx \alpha \cdot RS5 + (1 - \alpha) \cdot RS3 \qquad \text{[Equation 7]}$$

$$\approx \alpha \cdot (RX2 + RX3) + (1 - \alpha) \cdot (RX5 + RX6)$$

According to an example embodiment, the image processing apparatus may enhance the interpolation performance by rearranging the transformation matrix T and by including relevant information in each corresponding area as described below with reference to FIG. 8. Hereinafter, a rearrangement condition and a rearrangement process will be described.

Figure 4:
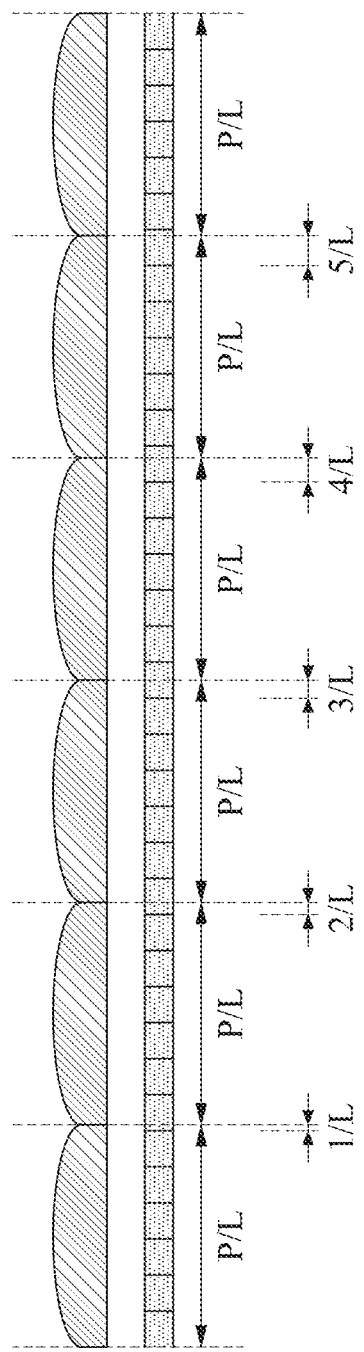
FIG. 4 illustrates another example of a relationship between a number of sensing elements and a number of lenses according to an exemplary embodiment.

FIG. 4 illustrates an example of a relationship between a number of sensing elements and a number of lenses according to an example embodiment.

A number of lenses included in a lens array and a number of sensing elements included in a sensor may be relatively prime and may satisfy Equation 8.

$$P=L*N+1 \quad \text{[Equation 8]}$$

In Equation 8, P denotes the number of sensing elements, L denotes the number of lenses, and N denotes a natural number.

In detail, referring to FIG. 4, since L is 6 and P is 37, they are relatively prime. Here, each lens may cover 37/6 sensing elements.

In more detail, a first lens may cover zero$^{th}$ to $(6+1/6)^{th}$ sensing elements, a second lens may cover $(6+1/6)^{th}$ to $(12+2/6)^{th}$ sensing elements, and a last lens may cover $(30+5/6)^{th}$ to $37^{th}$ sensing elements. That is, each lens may cover a sensing element and further cover a sensing element corresponding to disparity by 1/L such that each lens covers (1+1/L) sensing element.

According to an example embodiment, the image processing apparatus may reconstruct a high-resolution image having a color closer to that of an original image by applying rearrangement and color interpolation to a first image captured using the lens array and the sensor that are relatively prime and satisfy Equation 8.

Figure 5:
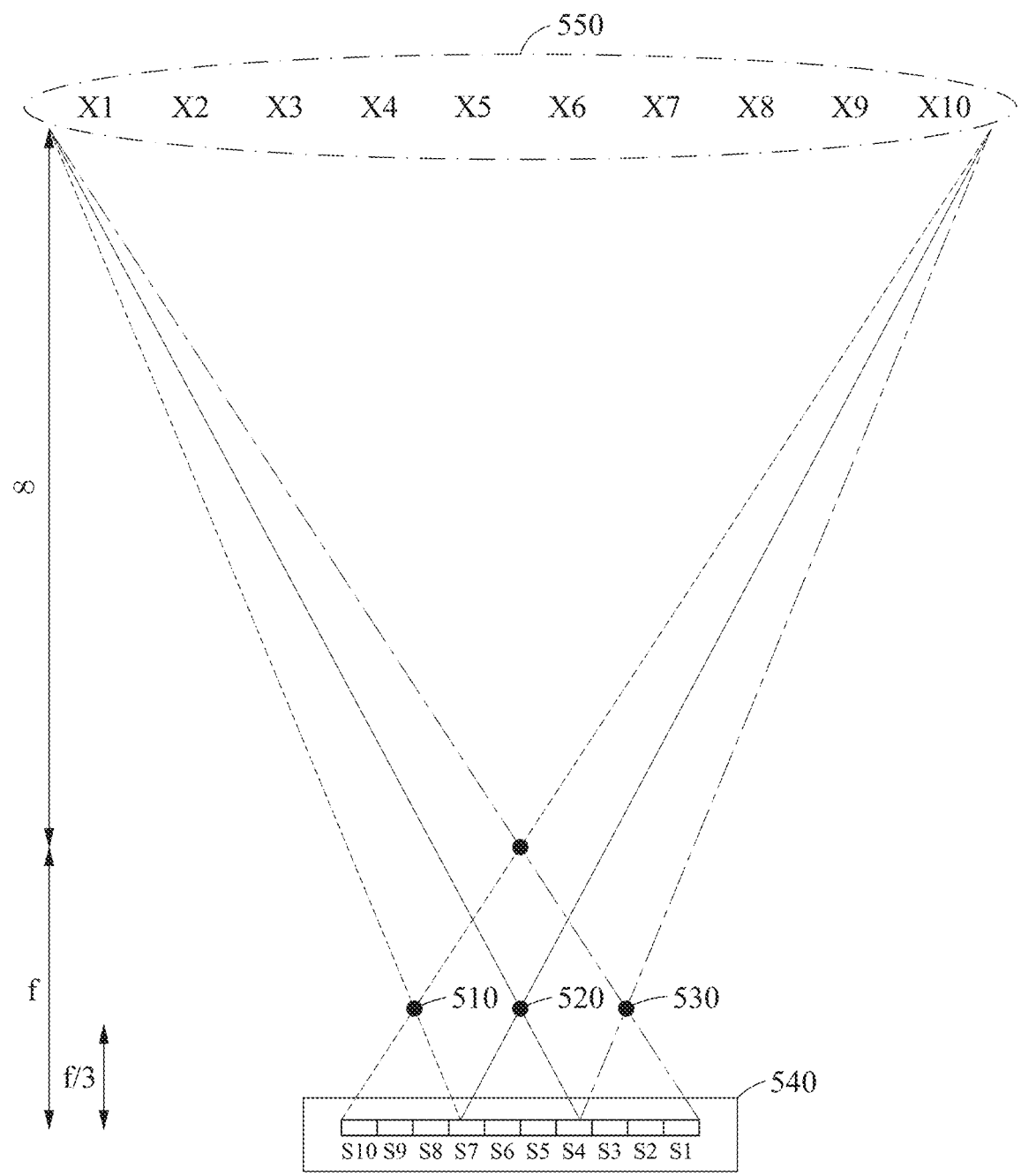
FIG. 5 illustrates an example in which a sensor receives rays corresponding to a scene present at an infinite distance according to an example embodiment.
Figure 6:
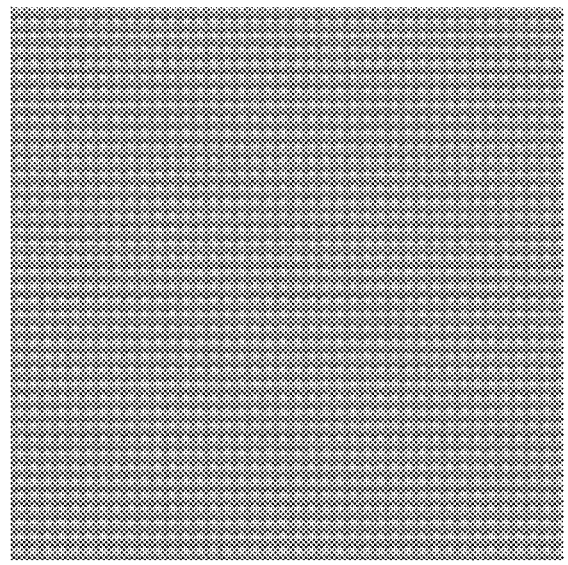
FIG. 6 illustrates an example of a first image acquired using a lens array and a sensor of FIG. 5, and a rearranged first image according to an example embodiment.
Figure 6:
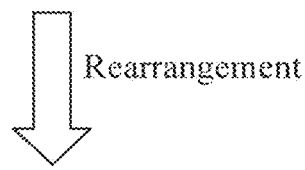
Figure 6:
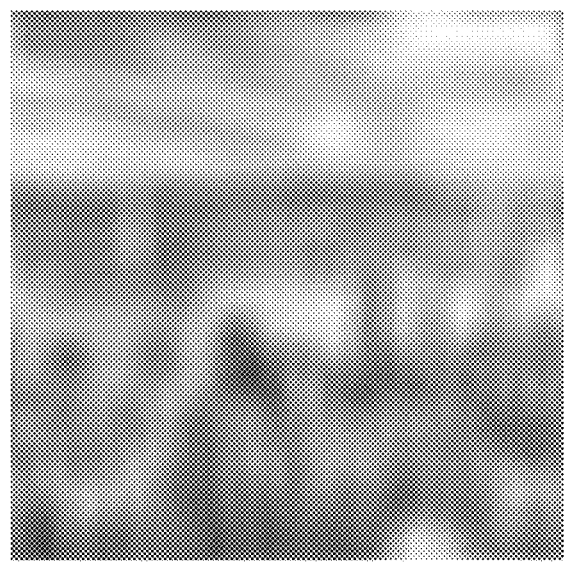

FIG. 5 illustrates an example in which a sensor receives rays corresponding to a scene present at an infinite distance according to an example embodiment, and FIG. 6 illustrates an example of a first image acquired using a lens array and a sensor of FIG. 5, and a rearranged first image according to an example embodiment. Here, an original image may be the scene present at the infinite distance and the first image may be an image captured using the lens array and the sensor.

Referring to FIG. 5, a sensor 540 may receive rays X1, X2, X3, X4, X5, X6, X7, X8, X9, and X10 corresponding to the scene present at the infinite distance. The rays X1 to X10 may be detected at the sensor 540 through lenses 510, 520, and 530. Here, a number of lenses 510, 520, and 530 is 3, and a number of sensing elements S1, S2, S3, S4, S5, S6, S7, S8, S9, and S10 included in the sensor 540 is 10. That is, they are relatively prime and satisfy Equation 8. Accordingly, each of the lenses 510, 520, and 530 may cover a sensing element and further cover a sensing element corresponding to disparity by ⅓ and a transformation matrix T may meet a full rank condition.

According to an example embodiment, a distance between a number of lenses and a sensor may be inversely proportional to the number of lenses. Referring to FIG. 5, when the three lenses 510, 520, and 530 are used, the distance between the lenses 510, 520, and 530 and the sensor 540 may be f/3. Alternatively, when five lenses are used, a distance between the lenses and the sensor 540 may be f/5, f being a focal length of each of the lenses.

Similar to Equation 1, sensing information generated by the sensing elements S1 to S10 of FIG. 5 may be modeled as represented by Equation 9, using source signal information corresponding to the rays X1 to X10 incident from the respective corresponding viewpoints 550.

$$\begin{bmatrix} S1 \\ S2 \\ S3 \\ S4 \\ S5 \\ S6 \\ S7 \\ S8 \\ S9 \\ S10 \end{bmatrix} = 1/3 \begin{bmatrix} 1 & 1 & 1 & 0 & 0 & 0 & 0 & 0 & 0 & 0 \\ 0 & 0 & 0 & 1 & 1 & 1 & 0 & 0 & 0 & 0 \\ 0 & 0 & 0 & 0 & 0 & 0 & 1 & 1 & 1 & 0 \\ 1 & 1 & 0 & 0 & 0 & 0 & 0 & 0 & 0 & 1 \\ 0 & 0 & 1 & 1 & 1 & 0 & 0 & 0 & 0 & 0 \\ 0 & 0 & 0 & 0 & 0 & 1 & 1 & 1 & 0 & 0 \\ 1 & 0 & 0 & 0 & 0 & 0 & 0 & 0 & 1 & 1 \\ 0 & 1 & 1 & 1 & 0 & 0 & 0 & 0 & 0 & 0 \\ 0 & 0 & 0 & 0 & 1 & 1 & 1 & 0 & 0 & 0 \\ 0 & 0 & 0 & 0 & 0 & 0 & 0 & 1 & 1 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \quad \text{[Equation 9]}$$

The transformation matrix T of Equation 9 may be rearranged as represented by Equation 10. That is, Equation 10 rearranged from Equation 9 shows that elements of the transformation matrix T are arranged in desired sequence and at intervals. Referring to FIG. 6, a first image 610 may be rearranged to be a rearranged first image 620 in response to rearranging the transformation matrix T.

Here, the sequence represents sequence in which the sensing elements S4, S1, S8, S5, S2, S9, S6, S3, S10, and S7 are arranged. It can be verified from Equation 10 that matrix constituent elements, Is, of the transformation matrix T are arranged in a direction of an arrow indicator. Here, the Is may be arranged at consistent intervals in the direction of the arrow indicator.

$$\begin{pmatrix} S4 \\ S1 \\ S8 \\ S5 \\ S2 \\ S9 \\ S6 \\ S3 \\ S10 \\ S7 \end{pmatrix} = \frac{1}{3} \begin{pmatrix} 1 & 1 & 0 & 0 & 0 & 0 & 0 & 0 & 0 & 1 \\ 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 1 & 0 & 0 & 0 & 0 & 0 & 0 & 0 & 1 & 1 \end{pmatrix} \begin{pmatrix} X1 \\ X2 \\ X3 \\ X4 \\ X5 \\ X6 \\ X7 \\ X8 \\ X9 \\ X10 \end{pmatrix}$$

According to an example embodiment, rearrangement of a transformation matrix indicates that only the arrangement sequence is changed without loss and modification of information received or detected by a sensing element.

Figure 7:
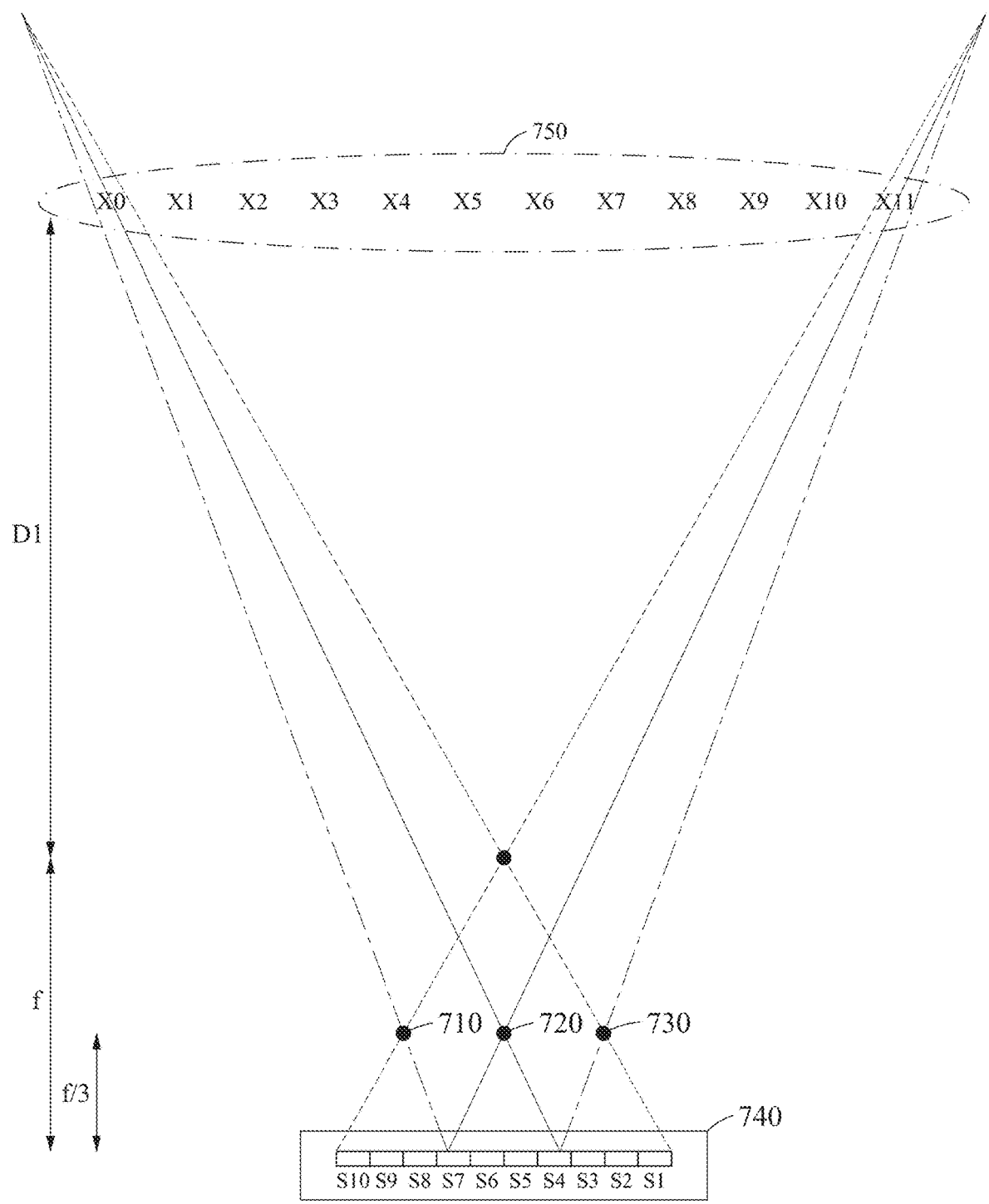
FIG. 7 illustrates an example in which a sensor receives rays corresponding to a scene present at a finite distance D1 according to an example embodiment.

FIG. 7 illustrates an example in which a sensor receives rays corresponding to a scene present at a finite distance D1 according to an example embodiment. Here, an original image may be the scene present at the finite distance D1 and a first image may be an image captured using a lens array and a sensor.

Referring to FIG. 7, a sensor 740 may receive rays X0, X1, X2, X3, X4, X5, X6, X7, X8, X9, X10, and X11 corresponding to the scene present at the finite distance D1, which differs from the example of FIG. 5. The rays X0 to X11 may be detected at the sensor 740 through lenses 710, 720, and 730. Here, the number of lenses 710, 720, and 730 is 3 and a number of sensing elements S1, S2, S3, S4, S5, S6, S7, S8, S9, and S10 included in the sensor 740 is 10. That is, they are relatively prime and satisfy Equation 8, which is similar to the example of FIG. 5. Accordingly, each of the lenses 710, 720, and 730 may further cover a sensing element corresponding to polarity by ⅓ and a transformation matrix T may meet a full rank condition.

A field of view of a lens of FIG. 7 is wider than that of FIG. 5. For example, compared to the sensor 540 that receives the rays X1 to X10 corresponding to the scene present at the infinite distance through the lenses 510, 520, and 530, the sensor 740 may receive the rays X0 to X11 corresponding to the scene present at the finite distance D1. For example, the lens 730 may receive the rays X0 to X11, and thus, further receive the ray X11 in addition to rays X0 to X10 compared to the lens 530. Accordingly, the sensor 740 may receive source signal information greater by 1.1 than that of the sensor 540.

Similar to Equation 1, sensing information generated by the sensing elements S1 to S10 of FIG. 7 may be modeled as represented by Equation 11, using source signal information corresponding to the rays X0 to X11 incident from the respective corresponding viewpoints 750.

$$\begin{bmatrix} S1 \\ S2 \\ S3 \\ S4 \\ S5 \\ S6 \\ S7 \\ S8 \\ S9 \\ S10 \end{bmatrix} = \frac{1}{3.3} \begin{bmatrix} 0 & 1 & 1 & 1 & 0.3 & 0 & 0 & 0 & 0 & 0 & 0 & 0 \\ 0 & 0 & 0 & 0 & 0.7 & 1 & 1 & 0.6 & 0 & 0 & 0 & 0 \\ 0 & 0 & 0 & 0 & 0 & 0 & 0 & 0.4 & 1 & 1 & 0.9 & 0 \\ 0.5 & 1 & 0.7 & 0 & 0 & 0 & 0 & 0 & 0 & 0 & 0.1 & 1 \\ 0 & 0 & 0.3 & 1 & 1 & 1 & 0 & 0 & 0 & 0 & 0 & 0 \\ 0 & 0 & 0 & 0 & 0 & 0 & 1 & 1 & 1 & 0.3 & 0 & 0 \\ 1 & 0.1 & 0 & 0 & 0 & 0 & 0 & 0 & 0 & 0.7 & 1 & 0.5 \\ 0 & 0.9 & 1 & 1 & 0.4 & 0 & 0 & 0 & 0 & 0 & 0 & 0 \\ 0 & 0 & 0 & 0 & 0.6 & 1 & 1 & 0.7 & 0 & 0 & 0 & 0 \\ 0 & 0 & 0 & 0 & 0 & 0 & 0 & 0.3 & 1 & 1 & 1 & 0 \end{bmatrix} \begin{bmatrix} X0 \\ X1 \\ X2 \\ X3 \\ X4 \\ X5 \\ X6 \\ X7 \\ X8 \\ X9 \\ X10 \\ X11 \end{bmatrix}$$

[Equation 11]

The transformation matrix T of Equation 11 may be rearranged based on the infinite distance, as represented by Equation 12. That is, in Equation 12 rearranged from Equation 11 based on the infinite distance, the sensing elements may be arranged in the same sequence to that of Equation 10.

Similar to Equation 10, Equation 12 shows that elements of the transformation matrix T maintain the same sequence and nearly consistent intervals. For example, similar to Equation 10, the sequence represents in which the sensing elements S4, S1, S8, S5, S2, S9, S6, S3, S10, and S7 are arranged in Equation 12. Also, similar to Equation 10, the matrix constituent elements of the transformation matrix T are arranged in a direction of an arrow indicator. Here, similar to Equation 10, the matrix constituent elements of Equation 12 are arranged at nearly consistent intervals.

$$\begin{bmatrix} S4 \\ S1 \\ S8 \\ S5 \\ S2 \\ S9 \\ S6 \\ S3 \\ S10 \\ S7 \end{bmatrix} = \frac{1}{3.3} \begin{bmatrix} 0.5 & 1 & 0.7 & 0 & 0 & 0 & 0 & 0 & 0 & 0 & 0.1 & 1 \\ 0 & 1 & 1 & 1 & 0.3 & 0 & 0 & 0 & 0 & 0 & 0 & 0 \\ 0 & 0.9 & 1 & 1 & 0.4 & 0 & 0 & 0 & 0 & 0 & 0 & 0 \\ 0 & 0 & 0.3 & 1 & 1 & 1 & 0 & 0 & 0 & 0 & 0 & 0 \\ 0 & 0 & 0 & 0 & 0.7 & 1 & 1 & 0.6 & 0 & 0 & 0 & 0 \\ 0 & 0 & 0 & 0 & 0.6 & 1 & 1 & 0.7 & 0 & 0 & 0 & 0 \\ 0 & 0 & 0 & 0 & 0 & 0 & 1 & 1 & 1 & 0.3 & 0 & 0 \\ 0 & 0 & 0 & 0 & 0 & 0 & 0 & 0.4 & 1 & 1 & 0.9 & 0 \\ 0 & 0 & 0 & 0 & 0 & 0 & 0 & 0.3 & 1 & 1 & 1 & 0 \\ 1 & 1 & 0 & 0 & 0 & 0 & 0 & 0 & 0 & 0.7 & 1 & 0.5 \end{bmatrix} \begin{bmatrix} X0 \\ X1 \\ X2 \\ X3 \\ X4 \\ X5 \\ X6 \\ X7 \\ X8 \\ X9 \\ X10 \\ X11 \end{bmatrix}$$

Although rearrangement is performed, the sensing element S9 may detect sensing information from some rays X4, X5, X6, and X7 corresponding to the scene present at the finite distance D1. Also, the sensing element S6 may detect sensing information from some rays X6, X7, X8, and X9 corresponding to the scene present at the finite distance D1.

As described above, since the number of sensing elements and the number of lenses are relatively prime and satisfy Equation 8, sequence of internal components of the transformation matrix T is maintained and intervals therebetween are maintained to be nearly consistent as shown in Equation 10 and Equation 12.

If the number of sensing elements and the number of lenses satisfy a relatively prime condition but does not satisfy Equation 8, the intervals may not be maintained to be consistent based on the finite distance D1 at which the scene is captured. Also, sequence of internal components may vary. Accordingly, a rearranged first image may have relatively low color uniformity. Here, the color uniformity refers to uniformity of RGB that is an example of a color coordinate system.

Figure 8:
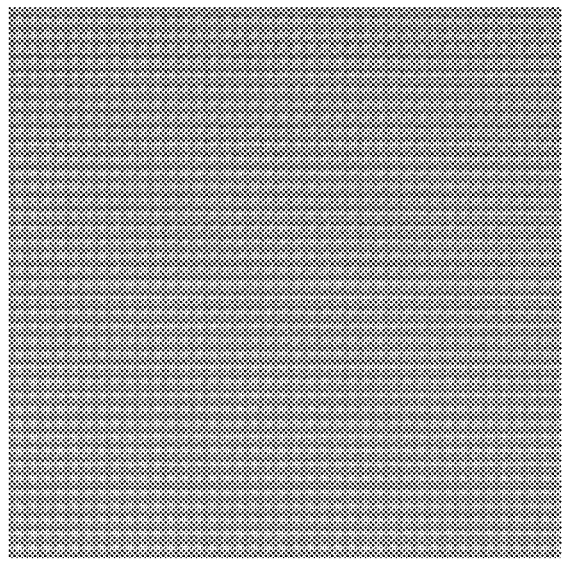
FIG. 8 illustrates an example of a first image acquired using a lens array and a sensor of FIG. 7, and a rearranged first image according to an example embodiment.
Figure 8:
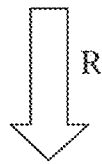
Figure 8:
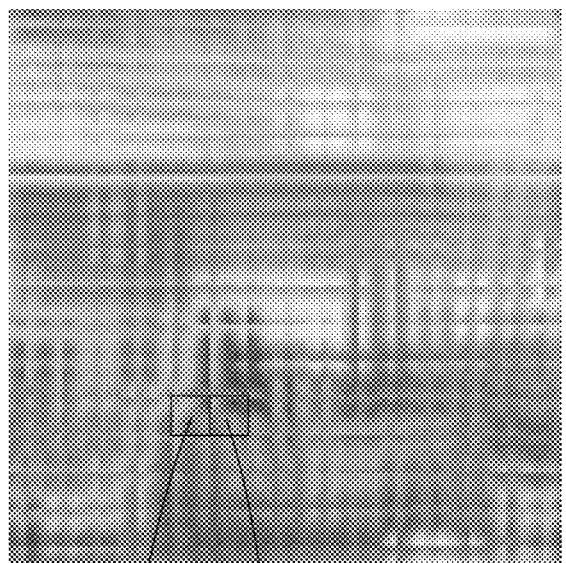

FIG. 8 illustrates an example of a first image acquired using a lens array and a sensor of FIG. 7, and a rearranged first image according to an example embodiment.

Referring to FIG. 8, a first image 810 may be rearranged to be a rearranged first image 820 in response to rearranging a transformation matrix T. The rearranged first image 820 may include an inconsecutive session based on a predetermined unit. For example, inconsecutive sections may be present between an area 1 821 and an area 2 822, and may be present between other areas. In detail, the rearranged first image 820 may include an inconsecutive section per, for example, unit of L*L. Here, L denotes the number of lenses.

The area 1 821 may represent an area that is surrounded by four inconsecutive sections. Also, the area 2 822 may represent an area that is surrounded by four inconsecutive sections. Here, each of the area 1 821 and the area 2 822 may include relevant, as described above with reference to FIG. 3, required for a color interpolation by the rearrangement.

Since RGB, which is one example of the color coordinate system, is uniformly arranged in each of the area 1 821 and the area 2 822, the image processing apparatus may generate a second image by performing an internal color interpolation on each of the area 1 821 and the area 2 822. The image processing apparatus may output a high-resolution image close to an original image by reconstructing the color-interpolated second image.

When an external color interpolation is performed on the area 1 821 and the area 2 822 instead of performing the internal color interpolation, the color interpolation may not be performed using the relevant information, and the resolution of the image output by the image processing apparatus may be lower although the second image is reconstructed.

Figure 9:
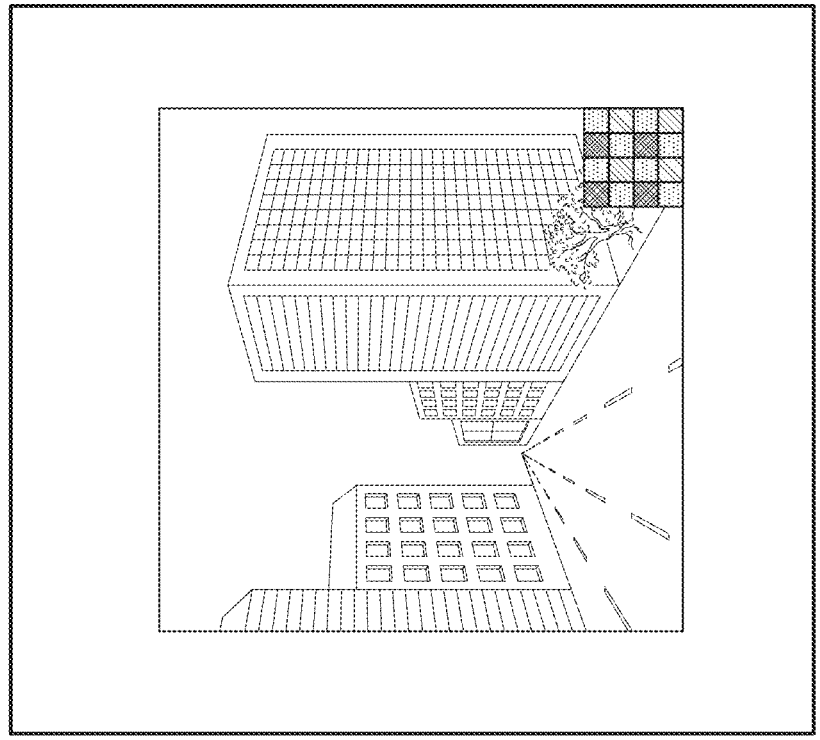
FIG. 9 illustrates an example of a process of rearranging a first image according to an example embodiment.
Figure 9:
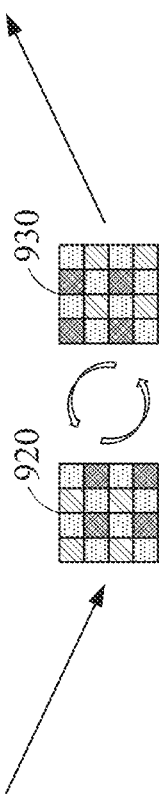
Figure 9:
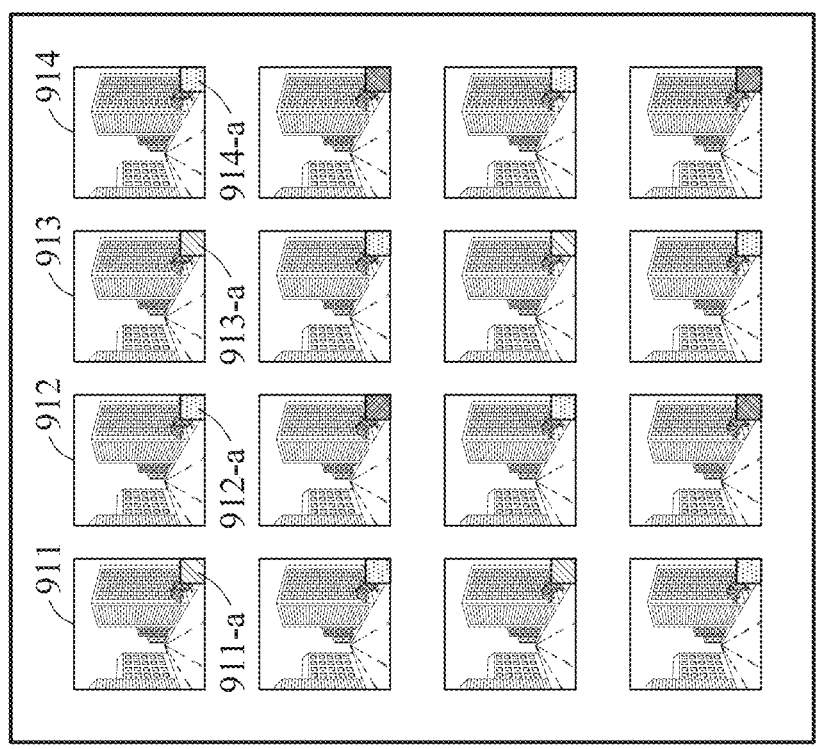

FIG. 9 illustrates an example of a process of rearranging a first image according to an example embodiment.

As described above, a transformation matrix determined based on a sensor and a lens array may be rearranged by performing a process of rearranging the first image for a simpler color interpolation, as follows.

Referring to FIG. 9, in response to a Bayer filter being applied as an example of a color filter to each lens, a first image 910 may be a set of a plurality of images 911, 912, 913, 914, . . . . Here, each of the plurality of images 911, 912, 913, 914, . . . may represent a scene captured using each corresponding lens and a sensor. For example, the plurality of images 911, 912, 913, 914, . . . may represent a scene captured using 16 lenses and the sensor including 17 sensing elements. The image 911 may be a scene captured using a first lens and the sensor, the image 912 may be a scene captured using a second lens and the sensor, and the image 913 may be a scene captured using a third lens and the sensor.

Each of the images 911, 912, 913, 914, . . . may be a set of a plurality of constituent elements. Here, each of the plurality of constituent elements may be generated by a sensing element corresponding to each lens. For example, a constituent element 911-*a* may be generated by a last sensing element corresponding to the first lens, a constituent element 912-*a* may be generated by a last sensing element corresponding to the second lens, a constituent element 913-*a* may be generated by the last sensing element corresponding to the third lens, and a constituent element 914-*a* may be generated by a last sensing element corresponding to the fourth lens.

As shown in a box 920, the image processing apparatus may collect constituent elements 911-*a*, 912-*a*, 913-*a*, 914-*a*, . . . , of the same location from the plurality of images 911, 912, 913, 914, . . . , respectively. Here, the constituent elements 911-*a*, 912-*a*, 913-*a*, 914-*a*, . . . , of the same location may be respectively generated by the last sensing elements corresponding to the respective corresponding lenses.

As shown in a box 930, the image processing apparatus may perform a phase-inversion of the collected constituent elements 911-*a*, 912-*a*, 913-*a*, 914-*a*, . . . , of the same location to rotate by 180 degrees, as shown in a box 930, and may map the phase-converted constituent elements 911-*a*, 912-*a*, 913-*a*, 914-*a*, . . . , of the same location. The image processing apparatus may acquire a rearranged first image 940 by applying the same process to the last sensing element and all of the sensing elements corresponding to each lens.

The rearranged first image 940 may include an inconsecutive section present based on a predetermined unit. RGB may be uniformly arranged in an area surrounded by such nonconsecutive sections. Accordingly, the image processing apparatus may generate a second image by performing an internal color interpolation on each area surrounded by such inconsecutive sections and may output a high-resolution image by reconstructing the second image.

Figure 10:
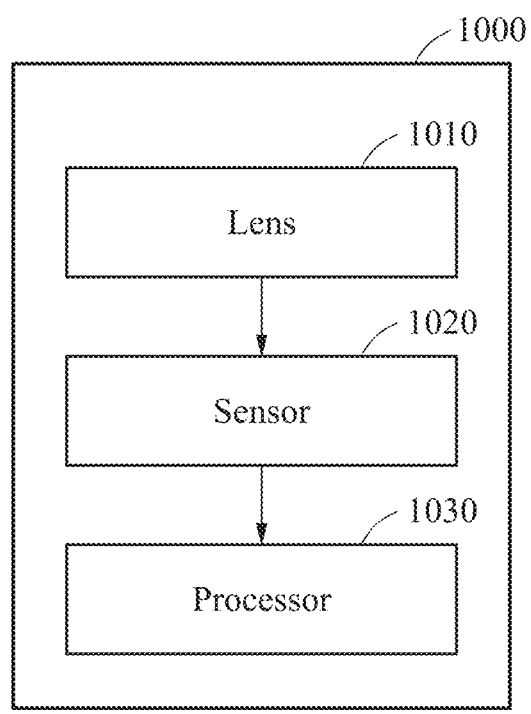
FIG. 10 is a block diagram illustrating an example of an image processing apparatus according to an example embodiment.

FIG. 10 illustrates an example of an image processing apparatus according to an example embodiment.

Referring to FIG. 10, an image processing apparatus 1000 may include a lens 1010, a sensor 1020, and a processor 1030.

A lens array may include a plurality of lenses 1010, and the lens 1010 may refract and transmit a ray. A number of the plurality of lenses 1010 and a number of a plurality of sensing elements included in the sensor 1020 may be relatively prime and disposed to have disparity by 1/L. Here, L denotes the number of lenses 1010. Accordingly, when a first image captured using the lens 1010 and the sensor 1020 is rearranged, the rearranged first image may have a relatively high color uniformity. Accordingly, interpolation performance may be enhanced to perform a color interpolation.

The sensor 1020 may include the plurality of sensing elements, and each of the plurality of sensing elements may generate sensing information corresponding to a ray received through the lens 1010. Accordingly, the image processing apparatus 1000 may generate the first image that is a scene captured using the lens 1010 and the sensor 1020.

Each of the sensing elements may detect color information corresponding to a single color. For example, a sensing element 1 may detect color information corresponding to a first color, for example, red, from an incident ray, and a sensing element 2 may detect color information corresponding to a second color, for example, green or blue, from an incident ray. Here, the first color and the second color may differ from each other. Each of the sensing elements may detect color information corresponding to one of red, green, and blue, and may also detect color information corresponding to one of colors based on another color coordinate system.

The processor 1030 may rearrange the first image in response to rearranging a transformation matrix based on the number of sensing elements and the number of lenses. Also, the processor 1030 may generate a second image by performing a color interpolation on the rearranged first image. Once the second image is reconstructed, the processor 1030 may output a high-resolution image corresponding to an original image.

Figure 11:
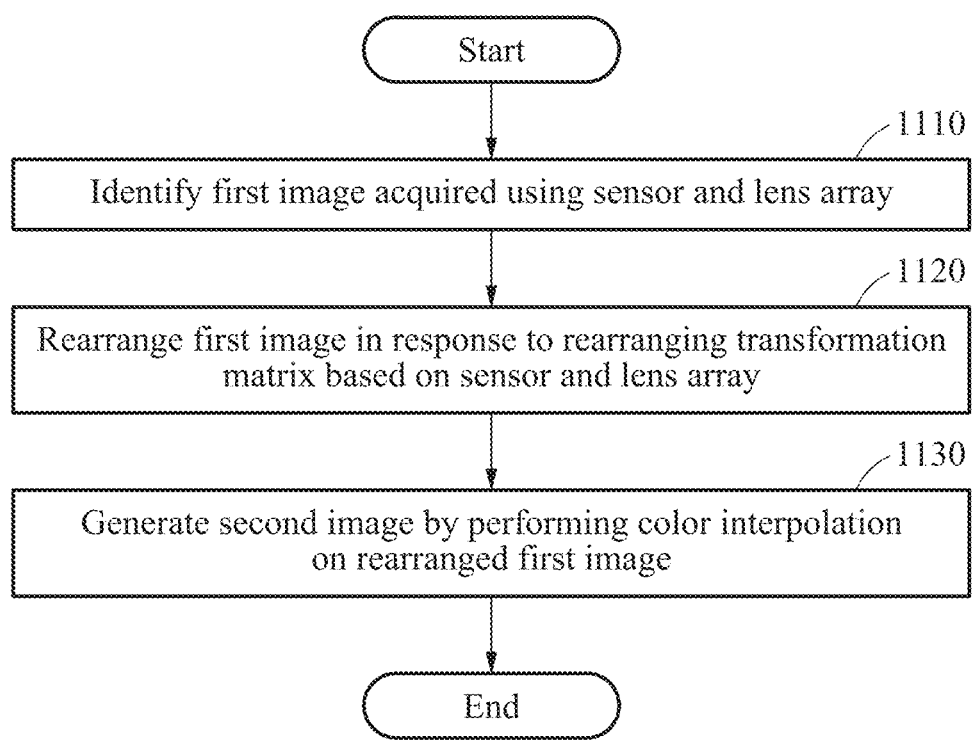
FIG. 11 is a flowchart illustrating an example of an image processing method performed by an image processing apparatus according to an example embodiment.

FIG. 11 is a flowchart illustrating an example of an image processing method performed by an image processing apparatus according to an example embodiment.

Referring to FIG. 11, in operation 1110, the image processing apparatus may identify a first image acquired using a sensor and a lens array. Here, the first image may be an image captured using the sensor and the lens array. The sensor and the lens array may be provided in the image processing apparatus and a processor included in the image processing apparatus may identify the captured first image. According to an example embodiment, the sensor and the lens array may be provided outside the image processing apparatus and the processor may receive and identify the captured first image.

Here, a number of sensing elements and a number of lenses may be relatively prime. In detail, the number of sensing elements may be a natural multiple of the number of lenses+1. Here, each lens may cover a sensing element and further cover a sensing element by 1/L such that each lens covers (1+1/L) sensing element. Accordingly, the image processing apparatus may include, in each area, relevant information that is more easily available for a color interpolation by rearranging the first image in response to rearranging a transformation matrix.

In operation 1120, the image processing apparatus may rearrange the first image in response to rearranging the transformation matrix based on the sensor and the lens array. Here, the transformation matrix may be determined based on the number of the plurality of sensing elements and the number of the plurality of lenses, and may represent a relationship between source signal information and sensing information.

According to an example embodiment, a standard for rearranging a first image captured from a scene present at an infinite distance may be applied to rearrange a first image captured from a scene present at a finite distance. In detail, the image processing apparatus may collect constituent elements of the same location in the first image, and may acquire a rearranged first image by inverting a phase of the collected constituent elements and by mapping the phase-inverted constituent elements.

In operation 1130, the image processing apparatus may generate a second image by performing a color interpolation on the rearranged first image. The rearranged first image may include an inconsecutive section based on a predetermined unit. RGB may be uniformly arranged in an area surrounded by inconsecutive sections.

Once a color interpolation is performed on each area surrounded by such inconsecutive sections, the image processing apparatus may generate the second image with the enhanced interpolation performance. Accordingly, the image processing apparatus may output a high-resolution image close to an original image by reconstructing the color-interpolated second image.

Figure 12:
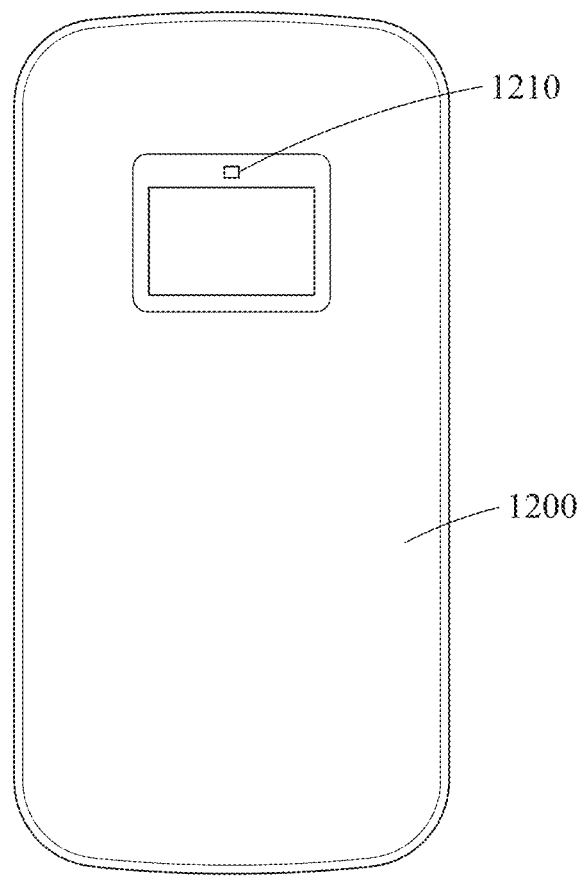
FIGS. 12 and 13 illustrate examples of a device to which an image processing apparatus is applicable according to an example embodiment.
Figure 13:
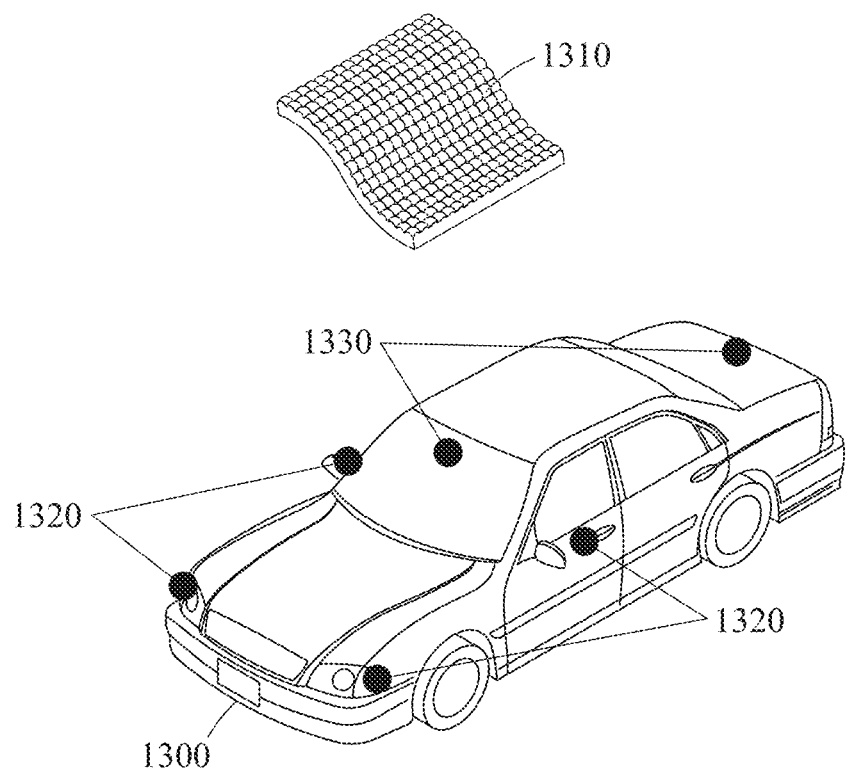

FIGS. 12 and 13 illustrate examples of a device to which an image processing apparatus is applicable according to an example embodiment.

The image processing apparatus may be applied to various fields for outputting an image captured using a lens and a sensor, as a high-resolution image. The image processing apparatus may include a sensor including a plurality of sensing elements, which is separate by a relatively short focal length from a lens array since the lens array includes a plurality of lenses.

According to an example embodiment, the volume of the image processing apparatus may decrease using the plurality of lenses. Accordingly, the image processing apparatus may be applied to a wearable device of which smaller volume may be needed, such as a user terminal, a smart watch, a smart band, and smart glasses.

For example, referring to FIG. 12, an image processing apparatus 1210 may be provided to a user terminal 1200 as a front camera. A sensor of the image processing apparatus 1210 may be in a full frame and a lens array of the image processing apparatus 1210 may include a micro lens.

Referring to FIG. 13, a vehicle 1300 may include an image processing apparatus at each of points 1320 and 1330. The volume of the image processing apparatus may be controllable and the image processing apparatus may be installed in the vehicle 1300 without causing a degradation in terms of a design or stability.

For example, the image processing apparatus provided to the vehicle 1300 as a front camera or a rear camera. Here, the image processing apparatus may use a curved lens array 1310. That is, the curved lens array 1310 designed to curve coupling portions between the respective lenses may be used for the image processing apparatus.

However, it is provided as an example only and the image processing apparatus may be applied to, for example, a digital single lens reflex (DSLR) camera, a drone, a closed-circuit television (CCTV), a webcam camera, a 360-degree camera, a camera for movie and broadcasting, and a virtual reality (VR)/augmented reality (AR) camera. Further, the image processing apparatus may be applied to various fields, such as, for example, a flexible/stretchable camera, an insect eye camera, and a contact lens type camera.

The example embodiments described herein may be implemented using hardware components, software components, and/or combination thereof. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. The processing device may include plurality of processing elements and plurality of types of processing elements. For example, a processing device may include plurality of processors or a processor and a controller. In addition, different processing configurations are possible, such parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While example embodiments have been described with reference to the figures, it will be understood by those of ordinary skill in the art that various changes in form and details may be made therein without departing from the spirit and scope as defined by the following claims.

What is claimed is:

1. An image processing method comprising:
    obtaining, by a sensor and a lens array, a first image corresponding to an original image;
    identifying the first image obtained by the sensor and the lens array;
    rearranging the first image in response to rearranging a transformation matrix based on the sensor and the lens array; and
    generating a second image by performing a color interpolation on the rearranged first image,
    wherein the rearranging the first image comprises:
        collecting a plurality of constituent elements of a same location in the first image; and
        performing a phase-inversion on the collected plurality of constituent elements of the location and mapping the phase-inverted plurality of constituent elements.

2. The image processing method of claim 1, wherein the sensor comprises a plurality of sensing elements,
    wherein the lens array comprises a plurality of lenses, and
    wherein a number of the plurality of sensing elements and a number of the plurality of lenses are relatively prime.

3. The image processing method of claim 2, wherein the transformation matrix is determined based on the number of the plurality of sensing elements and the number of the plurality of lenses.

4. The image processing method of claim 3, wherein the transformation matrix is rearranged based on a transformation matrix that is rearranged based on the original image being at an infinite distance.

5. The image processing method of claim 2, wherein, based on applying a color filter to the lens array, the first image is generated based on a number of the plurality of lenses being even and a number of the plurality of sensing elements being odd, the number of the plurality of lenses being odd and the number of the plurality of sensing elements being even, or the number of the plurality of lenses being odd and the number of the plurality of sensing elements being odd.

6. The image processing method of claim 2, wherein, based on applying a color filter to the sensor, the first image is generated based on a number of the plurality of lenses being even and a number of the plurality of sensing elements being odd or the number of the plurality of lenses being odd and the number of the plurality of sensing elements being even.

7. The image processing method of claim 2, wherein the number of the plurality of sensing elements is a natural multiple of the number of the plurality of lenses plus 1.

8. The image processing method of claim 1, further comprising:
    outputting an image corresponding to the original image by reconstructing the color-interpolated second image.

9. A non-transitory computer-readable medium storing instructions that, when executed by a processor, cause the processor to perform the image processing method of claim 1.

10. An image processing method comprising:
    obtaining, by a sensor and a lens array, a first image corresponding to an original image;
    identifying the first image obtained by the sensor and the lens array;
    rearranging the first image in response to rearranging a transformation matrix based on the sensor and the lens array; and
    generating a second image by performing a color interpolation on the rearranged first image,
    wherein the rearranged first image comprises an inconsecutive section based on a predetermined unit, and color uniformity of red-green-blue (RGB) is uniform in an area surrounded by the inconsecutive section.

11. The image processing method of claim 10, wherein the generating the second image comprises generating the second image by performing the color interpolation on the area surrounded by the inconsecutive section.

12. An image processing apparatus comprising:
    a processor; and
    a memory configured to store computer-readable instructions,
    wherein the processor is configured execute the instructions to:
        obtain, by a sensor and a lens array, a first image corresponding to an original image;
        identify the first image obtained by the sensor and the lens array;
        rearrange the generated first image based on rearranging a transformation matrix based on the sensor and the lens array;
        generate a second image by performing a color interpolation on the rearranged first image;
        collect a plurality of constituent elements of a same location in the first image; and
        perform a phase-inversion on the collected plurality of constituent elements of the same location, and map the phase-inverted plurality of constituent elements in response to rearranging the first image.

13. The image processing apparatus of claim 12, wherein the sensor comprises a plurality of sensing elements,
    wherein the lens array comprises a plurality of lenses,
    wherein a number of the plurality of sensing elements and a number of the plurality of lenses are relatively prime, and
    wherein the number of the plurality of sensing elements is a natural multiple of the number of the plurality of lenses plus 1.

14. The image processing apparatus of claim 13, wherein, based on applying a color filter to the lens array, the first image is generated based on a number of the plurality of lenses being even and a number of the plurality of sensing elements being odd, the number of the plurality of lenses being odd and the number of the plurality of sensing elements being even, or the number of the plurality of lenses being odd and the number of the plurality of sensing elements being odd.

15. The image processing apparatus of claim 13, wherein, based on applying a color filter to the sensor, the first image is generated based on a number of the plurality of lenses being even and a number of the plurality of sensing elements being odd or if the number of the plurality of lenses being odd and the number of the plurality of sensing elements being even.

16. The image processing apparatus of claim 12, wherein the transformation matrix is rearranged based on a transformation matrix that is rearranged based on the original image being at an infinite distance.

17. An image processing apparatus comprising:
    a processor; and
    a memory configured to store computer-readable instructions, wherein the processor is configured execute the instructions to:
  obtain, by a sensor and a lens array, a first image corresponding to an original image;
  identify the first image obtained by the sensor and the lens array;
  rearrange the generated first image based on rearranging a transformation matrix based on the sensor and the lens array;
  generate a second image by performing a color interpolation on the rearranged first image,
wherein the rearranged first image comprises an inconsecutive section based on a predetermined unit, and a color uniformity of red-green-blue (RGB) is uniform in an area surrounded by the inconsecutive section.

18. The image processing apparatus of claim 17, wherein the processor is further configured to generate the second image by performing the color interpolation on the area surrounded by the inconsecutive section, based on generating the second image by performing the color interpolation on the rearranged first image.

* * * * *